(12) United States Patent
Yan et al.

(10) Patent No.: US 12,442,669 B2
(45) Date of Patent: Oct. 14, 2025

(54) INTEGRATED SYSTEM FOR OPTICAL FIBER SENSING AND COMMUNICATION THROUGH SHARING CO-FREQUENCY RESOURCES

(71) Applicant: SOUTHWEST JIAOTONG UNIVERSITY, Chengdu (CN)

(72) Inventors: Lianshan Yan, Chengdu (CN); Haijun He, Chengdu (CN); Lin Jiang, Chengdu (CN); Anlin Yi, Chengdu (CN); Xihua Zou, Chengdu (CN); Wei Pan, Chengdu (CN)

(73) Assignee: SOUTHWEST JIAOTONG UNIVERSITY, Sichuan (CN)

( * ) Notice: Subject to any disclaimer, the term of this patent is extended or adjusted under 35 U.S.C. 154(b) by 284 days.

(21) Appl. No.: 18/456,144

(22) Filed: Aug. 25, 2023

(65) Prior Publication Data
US 2024/0426640 A1 Dec. 26, 2024

Related U.S. Application Data

(63) Continuation of application No. PCT/CN2023/102068, filed on Jun. 25, 2023.

(51) Int. Cl.
*H04B 10/071* (2013.01)
*G01D 5/353* (2006.01)
(Continued)

(52) U.S. Cl.
CPC ..... *G01D 5/35329* (2013.01); *G01D 5/35335* (2013.01); *G01D 5/35354* (2013.01);
(Continued)

(58) Field of Classification Search
CPC .......... H04B 10/07–077; H04B 10/079; H04B 10/50; H04B 10/516; H04B 10/564;
(Continued)

(56) References Cited

U.S. PATENT DOCUMENTS 5,477,323 A * 12/1995 Andrews ................ G01D 5/266
356/477
2019/0331508 A1* 10/2019 Gruca ................ G01D 5/35316
(Continued)

FOREIGN PATENT DOCUMENTS

GB 2625596 A * 6/2024 ............. G01H 9/004
WO WO-2015110177 A1 * 7/2015 ......... G01D 5/35383

*Primary Examiner* — Li Liu
(74) *Attorney, Agent, or Firm* — Valet Patent Service Limited (57) ABSTRACT

The present invention discloses an integrated system for optical fiber sensing and communication through sharing co-frequency resources. Specifically, the system consists of two parts: optical path detection and circuit demodulation. The entire system consists of a continuous wave laser, a fiber coupler, a polarization controller, a mach-zehnder modulator, an arbitrary waveform generator, an erbium-doped fiber amplifier, an optical filter, an optical fiber annular, an optical fiber, a photodetector, a data acquisition device, a balance detector and a data acquisition card. A transmission optical signal and a sensing detection light are generated by the same laser, transmission performance and sensing performance of the system are changed by adjusting modulation power of a transmission signal, the transmission signal is obtained by using direct detection at far-end, a sensing signal is obtained by using heterodyne coherent detection at local-end. The present invention provides a simple, compact and high-efficiency integrated system for co-frequency sharing optical fiber sensing and communication, to solve the deficiencies of the existing integrated system in practical applications.

4 Claims, 8 Drawing Sheets

(51) Int. Cl.
    *H04B 10/07*          (2013.01)
    *H04B 10/50*          (2013.01)
    *H04B 10/516*        (2013.01)
    *H04B 10/61*          (2013.01)
    *H04B 10/64*          (2013.01)

(52) U.S. Cl.
    CPC ....... *G01D 5/35361* (2013.01); *G01D 5/3538* (2013.01); *H04B 10/07* (2013.01); *H04B 10/071* (2013.01); *H04B 10/50* (2013.01); *H04B 10/516* (2013.01); *H04B 10/61* (2013.01); *H04B 10/64* (2013.01)

(58) Field of Classification Search
    CPC ........ H04B 10/61; H04B 10/63; H04B 10/64; G01D 5/28–35396; G01D 5/35354; G01D 5/35361
    USPC ............................ 398/9–21, 25, 28, 183, 204
    See application file for complete search history.

(56) References Cited

U.S. PATENT DOCUMENTS

| | | | | |
|---|---|---|---|---|
| 2022/0049979 | A1* | 2/2022 | Sternklar | ................ G01L 1/242 |
| 2022/0283021 | A1* | 9/2022 | Jiang | ..................... G01H 9/004 |

* cited by examiner

INTEGRATED SYSTEM FOR OPTICAL FIBER SENSING AND COMMUNICATION THROUGH SHARING CO-FREQUENCY RESOURCES

TECHNICAL FIELD

The present invention belongs to optical fiber communication technology, distributed optical fiber sensing, and particularly relates to an integrated system for optical fiber sensing and communication through sharing co-frequency resources.

BACKGROUND

In the past few decades, optical fiber communication networks have exploded with the rapid development of big data, cloud computing, Internet of Things, industrial Internet, digital transformation and so on. Currently, optical fiber communication networks have presented a ubiquitous state, data transmission using only the optical network can not meet the current demand, and there is an urgent need to open up more new functions for the huge optical network. Distributed optical fiber sensing technology has received extensive attention and a lot of research due to its advantages of high sensitivity, anti-electromagnetic interference, and long-distance fully distributed measurement. Among many distributed optical fiber sensing technologies, phase-sensitive optical time-domain reflection technology has been well applied and gained good feedback in the fields of oil and gas pipelines, structural health monitoring, high-speed rail speed measurement and positioning, high-speed rail perimeter protection, seismic monitoring, and distributed acoustic wave detection.

In fact, an optical fiber sensing system and an optical fiber communication system have high similarity, and both of them use many identical devices (laser, modulator, detector), especially using identical transmission medium (single-mode optical fiber, multi-mode optical fiber, etc.). In addition, many techniques in optical fiber communication are also applied to distributed optical fiber sensing to improve the performance of the optical fiber sensing system. Therefore, distributed optical fiber sensing is highly compatible with optical fiber communication, and it is easy to integrate distributed optical fiber sensing technology into existing optical communication networks.

Based on this, a few researchers have carried out research on an integrated system for optical fiber sensing and communication to integrate phase-sensitive optical time-domain reflection technology into existing optical fiber networks, and have realized field tests. However, the current integration schemes all adopt wavelength-division multiplexing and frequency-division multiplexing, and these integration methods only share the physical medium (optical fiber), which are still essentially two independent systems, and thus have the disadvantages of low integration degree, system complexity, and low transmission efficiency. In order to improve the integration degree of the integrated system as well as the transmission and sensing efficiency, it is urgent to break through this limitation. At present, there is no corresponding technical means in a research aspect of improving the integration degree of an integrated system for optical fiber sensing and communication to obtain a more compact and efficient system.

SUMMARY

In view of the disadvantages of the existing integrated system, such as high complexity and low efficiency, the present invention provides an integrated system for optical fiber sensing and communication through sharing co-frequency resources.

In the integrated system for optical fiber sensing and communication through sharing co-frequency resources according to the present invention, a transmission optical signal and a sensing detection light are generated by the same laser, transmission performance and sensing performance of the system are changed by adjusting modulation power of a transmission signal, the transmission signal is obtained by using direct detection (a single detector) at far-end, a sensing signal is obtained by using heterodyne coherent detection at local-end, and a specific structure is:

continuous light output from a continuous wave laser is divided into two paths after passing through a 90:10 fiber coupler A, 90% of the continuous light of an upper branch is injected into a mach-zehnder modulator A after being adjusted by a polarization controller A, the mach-zehnder modulator A operates in a carrier suppression modulation mode, the mach-zehnder modulator A is driven by a linear FM signal generated by an arbitrary waveform generator to generate a linear FM optical sideband, and light output from the mach-zehnder modulator A passes through an optical filter after being amplified by an erbium-doped fiber amplifier A, to retain only +1-order or −1-order sidebands and remove all remaining optical signals; a linear FM optical carrier output by the optical filter is injected into a mach-zehnder modulator B after adjusting a polarization state by a polarization controller B, the mach-zehnder modulator B is driven by a transmission signal generated from another port of the arbitrary waveform generator, an optical signal output from the mach-zehnder modulator B, after compensating for optical power loss by an erbium-doped fiber amplifier B, is injected into an optical fiber via an optical fiber annular, and an optical signal output from a far end of the optical fiber is converted into an electrical signal with a photodetector, and is subjected to digital signal processing after being acquired by a data acquisition device; scattered light generated in the optical fiber is output via a third port of the annular, output continuous light is coupled with continuous light output from a 10% output arm of the fiber coupler A by a fiber coupler B with a splitting ratio of 1:1, the 10% output arm of the fiber coupler A is used as local light, two output arms of the fiber coupler B are injected into two input ends of a balance detector respectively, to perform photoelectric conversion, and an electrical signal output from the balance detector is subjected to post-processing after being acquired by a data acquisition card.

Furthermore, the system adopts the linear FM optical carrier both as an optical carrier for pulse amplitude modulated transmission signal and as detection light for distributed optical fiber sensing.

Furthermore, a system communication signal and a distributed sensing signal are detected and demodulated at the far-end and the local-end, respectively.

Furthermore, the distributed sensing signal is acquired using the heterodyne coherent detection, and only a Rayleigh scattered signal corresponding to the linear FM optical carrier is retained in signal detection.

The beneficial technical effects of the present invention are:
(1) The system is simple, only adopts a single wavelength laser as a light source, and is highly integrated, simple, easy to realize, and easy to adjust.
(2) The whole system adopts a spectrum sharing method to realize an integrated system for sensing and communication, and has high spectrum efficiency.

(3) The whole system can flexibly adjust the system communication and distributed sensing performance only by adjusting the carrier sideband power ratio, which greatly improves the flexibility of the system and covers more application scenarios.

(4) The sensing part of the integrated system can flexibly adjust the spatial resolution and frequency response of the system only by changing the demodulation parameters during data processing, which provides better flexibility for different application scenarios.

BRIEF DESCRIPTION OF THE DRAWINGS

FIG. 2a-c is a test result of transmission performance of the present invention and compares it with the conventional single-frequency optical carrier PAM4 transmission system, where.

FIG. 3a-d is a test result of distributed vibration performance of the present invention, where.

FIG. 4a-c is a result diagram corresponding to changing the frequency response enhancement factor, where: FIG. 4b: a spectrogram corresponding to FIG. 4a.

FIG. 5a-c is a result diagram of the sensing performance changes before and after loading the communication transmission code, where.

DETAILED DESCRIPTION

The present invention is described in further detail below in combination with the accompanying drawings and specific embodiments.

Figure 1:
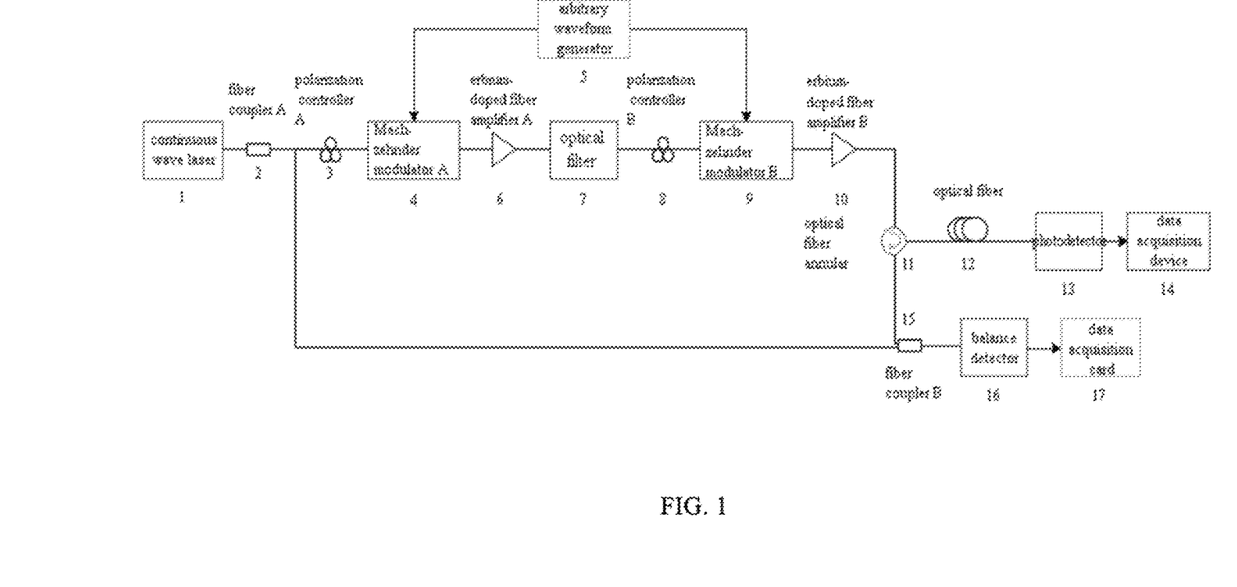
FIG. 1 is a structural diagram of the system according to the present invention.

As shown in FIG. 1, an integrated system for optical fiber sensing and communication through sharing co-frequency resources according to the present invention consists of two parts: an optical path and a circuit. Continuous light output from a continuous wave laser 1 is divided into two paths after passing through a 90:10 fiber coupler A2, 90% of the continuous light of an upper branch is injected into a mach-zehnder modulator A4 after being adjusted by a polarization controller A3, the mach-zehnder modulator A4 operates in a carrier suppression modulation mode, the mach-zehnder modulator A4 is driven by a linear FM (frequency-modulated) signal generated by an arbitrary waveform generator 5 to generate a linear FM optical sideband, and light output from the mach-zehnder modulator A4 passes through an optical filter 7 after being amplified by an erbium-doped fiber amplifier A6, to retain only +1-order or −1-order sidebands and remove all remaining optical signals; a linear FM optical carrier output by the optical filter 7 is injected into a mach-zehnder modulator B9 after adjusting a polarization state by a polarization controller B8, the mach-zehnder modulator B9 is driven by a transmission signal generated from another port of the arbitrary waveform generator 5, an optical signal output from the mach-zehnder modulator B9, after compensating for optical power loss by an erbium-doped fiber amplifier B10, is injected into an optical fiber 12 via an optical fiber annular 11, and an optical signal output from a far end of the optical fiber 12 is converted into an electrical signal with a photodetector 13, and is subjected to digital signal processing after being acquired by a data acquisition device 14; scattered light generated in the optical fiber 12 is output via a third port of the annular 11, output continuous light is coupled with continuous light output from a 10% output arm of the fiber coupler A2 by a fiber coupler B15 with a splitting ratio of 1:1, the 10% output arm of the fiber coupler A2 is used as local light, two output arms of the fiber coupler B15 are injected into two input ends of a balance detector 16 respectively, to perform photoelectric conversion, and an electrical signal output from the balance detector 16 is subjected to post-processing after being acquired by a data acquisition card 17.

During implementation, the bandwidth of the optical filter 7 is decided according to the linear FM bandwidth and needs to be greater than that; furthermore, the rising and falling edges of the filter should be as short as possible and an out-of-band rejection ratio is greater than 40 dB.

During implementation, the electrical-domain bandwidth of the photodetector 13 is usually selected to be 15 GHz or more. The bandwidth needs to be greater than the bandwidth of the modulated signal generated by the arbitrary waveform generator; the bandwidth can be compressed to 15 GHz for the 28Gbaud signal after the shaping filter, 28Gbaud is mainstream transmission code rate at present, and thus the value is usually 15 GHz or more.

During implementation, the electrical-domain bandwidth of the balance detector 16 is jointly decided by the bandwidth of the linear FM optical carrier and its frequency difference from the local oscillation light. For example, if the frequency bias is 1 GHz and the bandwidth of the linear FM light is 2 GHz, the bandwidth of the detector needs to be greater than 3 GHz.

An integrated system for optical fiber sensing and communication through sharing co-frequency resources is as follows:

In the integrated system for optical fiber sensing and communication through sharing co-frequency resources according to the present invention, the optical path adopts a linear FM optical carrier to replace a conventional single-frequency optical carrier, the linear FM optical carrier serves both as a carrier for the transmission signal and as a detection light for the distributed optical fiber sensing system, the far-end transmission signal adopts direct detection to convert an optical signal into an electrical signal, and the local-end adopts heterodyne coherent detection to obtain a sensing signal. The principle analysis is as follows:

The arbitrary waveform generator generates a linear FM waveform and modulates it onto the mach-zehnder modulator, which operates in the carrier suppression mode, and the generated linear FM optical carrier is expressed as:

$$E(t) = A\exp[j\omega t + j2\pi f_0 t + j\pi k t^2] \quad (1)$$

Where A is the amplitude of the optical carrier, $\omega$ is the angular frequency of the light output from the light source, $f_0$ is the bias frequency of the linear FM signal, and k is the chirp rate of the linear FM signal, which is equal to $B/T_p$, and B and $T_p$ are the bandwidth and period of the linear FM signal, respectively.

The transmission signal is loaded onto the generated linear FM optical carrier, and the optical signal to be transmitted is expressed as:

$$E_X(t) = A\cos\left[x(t) + \frac{\varphi_V}{2}\right]\exp\left(j\omega t + j2\pi f_0 t + j\pi k t^2 + j\frac{\varphi_V}{2}\right) \quad (2)$$

Where x(t) is the modulation phase generated corresponding to the transmission code, which is equal to $\pi V_x(t)/V_\pi$, $V_x(t)$ is the signal voltage, $V_\pi$ is the half-wave voltage of the modulator, $\varphi v$ is the bias phase, which is decided by the value of the voltage loaded onto the modulator, and normally, $\varphi v = \pm \pi/2$. The transmission signal is converted into an electrical signal at far-end using direct detection, and the electrical signal is expressed as:

$$I_X(t) = R \cdot E_X(t) \cdot E_X^*(t) = \frac{RA^2}{2}\{1 \pm \sin[2x(t)]\} \approx \frac{RA^2}{2}[1 \pm 2x(t)] \quad (3)$$

In the above equation, R is the conversion coefficient of the photodetector, where |2x(t)| usually needs to be less than 0.4 in order to obtain an undistorted transmission code (i.e., |x(t)|≤0.2). The above analysis shows that the transmission signal using linear FM optical carrier is realized by the same detection as well as demodulation method as conventional data transmission.

In addition, the expression $A\cos[x(t)+\varphi v/2]$ related to the code word in the above equation can be simplified by Taylor expansion, and the expanded Ex (t) is expressed as:

$$E_X(t) \approx \frac{\sqrt{2}}{2}A\left[1 - \frac{x^2(t)}{2} - x(t)\right]\exp\left(j\omega t + j2\pi f_0 t + j\pi k t^2 + j\frac{\pi}{4}\right) \quad (4)$$

The above equation can be decomposed into a DC component and an AC component, $$E_X(t) = E_{dc}(t) + E_{ac}(t) \quad (5-1)$$

$$E_{dc}(t) = \frac{\sqrt{2}}{2}A\exp\left(j\omega t + j2\pi f_0 t + j\pi k t^2 + j\frac{\pi}{4}\right) \quad (5-2)$$

$$E_{ac}(t) = -\frac{\sqrt{2}}{2}A\left[\frac{x^2(t)}{2} + x(t)\right]\exp\left(j\omega t + j2\pi f_0 t + j\pi k t^2 + j\frac{\pi}{4}\right) \quad (5-3)$$

In the demodulation of the sensing signal, only the backward Rayleigh scattered light generated by the DC component $E_{dc}(t)$ is demodulated, and the scattered light is expressed as:

$$E_R(t) = \frac{\sqrt{2}A}{2}\sum_{i=1}^{N} a(\tau_i)r(\tau_i) \cdot \exp[j\omega(t-\tau_i) + j2\pi f_0(t-\tau_i) + j\pi k(t-\tau_i)^2 + j\frac{\pi}{4}] \quad (6)$$

$$= \sum_{i=1}^{N} a(\tau_i)r(\tau_i)E_{dc}(t-\tau_i)$$

The sensing signal obtained after coherent detection is:

$$I_R(t) = i_I(t) + j \cdot i_Q(t) \quad (7)$$
$$= \text{real}[R_s \cdot E_R(t) \cdot E_L^*(t)] + j \cdot \text{imag}[R_s \cdot E_R(t) \cdot E_L^*(t)]$$
$$= R_s \cdot [s_{dc}(t) \otimes h(t)]$$

Where $$s_{dc}(t) = \frac{\sqrt{2}}{2}AA_L\exp\left[j2\pi(f_0 - f_1)t + j\pi k t^2 + j\frac{\pi}{4}\right] \quad (8)$$

$$h(t) = a(t)r(t)\exp(-j\omega t - j2\pi f_1 t)$$

A matched filter corresponding to Sac (t) is generated in the digital-domain, the sensing signal is by a convolution operation with the obtained sensing signal, and the demodulated signal is:

$$r(t) = I_R(t) \otimes s_{dc}^*(-t) = R_s \cdot [h(t) \otimes R(t)] + R_s \cdot [h(t) \otimes n(t)] \quad (9)$$

The above analysis shows that an effective sensing signal can be extracted from the transmission signal of the linear FM optical carrier. In summary, the above theoretical analysis proves that the present invention is feasible in principle.

Figure 2A:
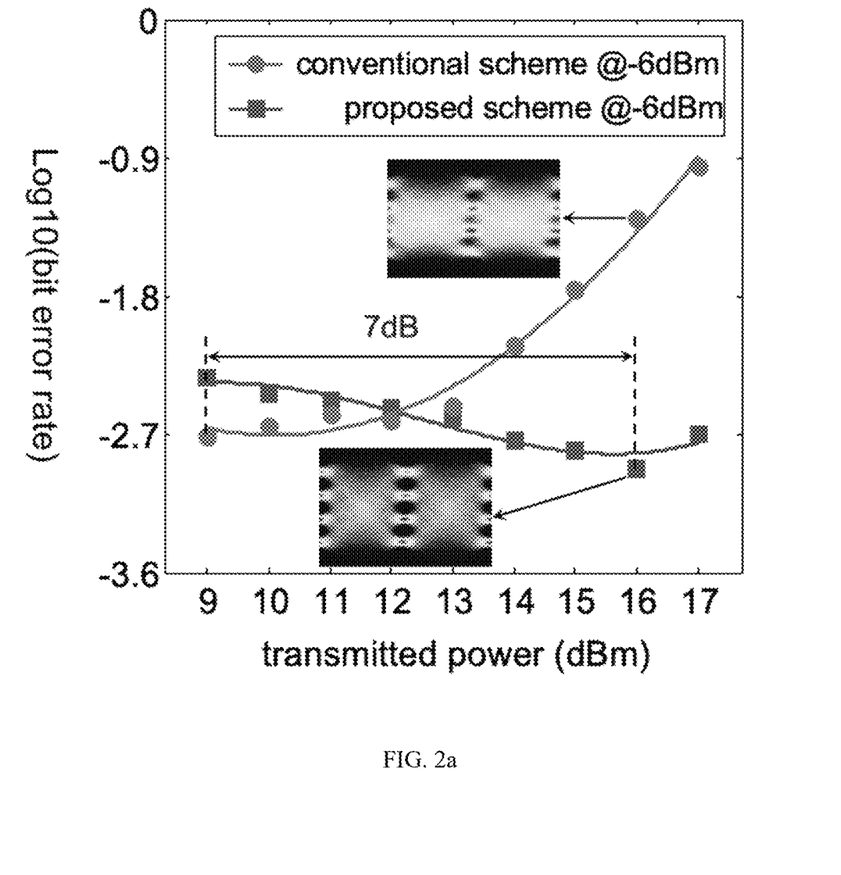
FIG. 2a: two bit error rate response curves are the performance change of the conventional single-frequency optical carrier with the increase of transmitted power, and the change of the transmission performance of the proposed integrated scheme with transmitted power, respectively.
Figure 2B:
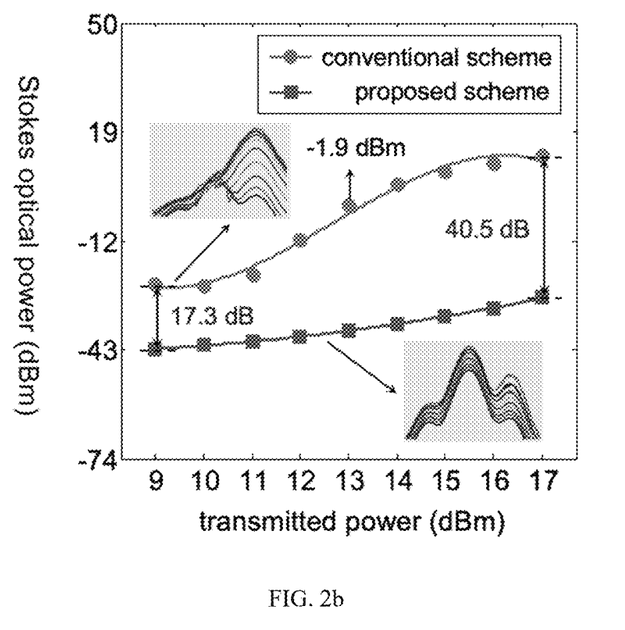
FIG. 2b: the change of backward Stokes optical power of the conventional scheme and the proposed scheme with the increase of transmitted power.
Figure 2C:
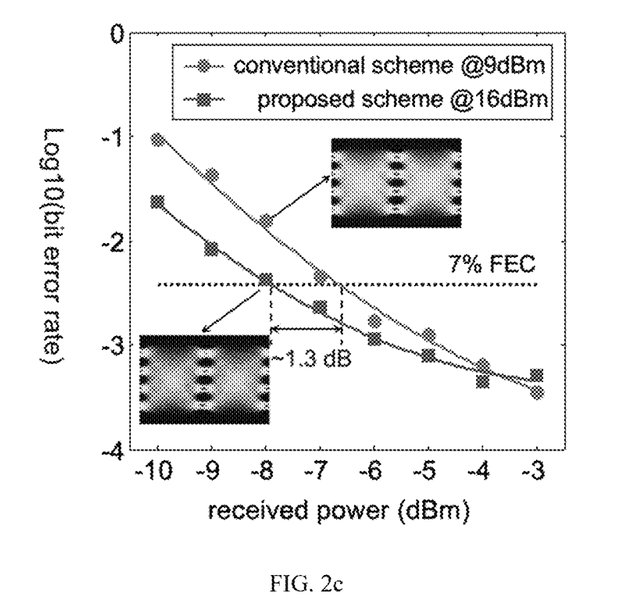
FIG. 2c: the transmission performance of the conventional scheme with different received powers at the optimal transmitted power (9 dBm), and the transmission performance of the proposed scheme with different received powers at the optimal transmitted power (16 dBm).

A comparison of the test result of transmission performance of the present invention with the conventional transmission-only system is shown in FIG. 2a-c, where a 24.5 km optical fiber with 56 Gbit/s rate is used for the test. Two bit error rate response curves in FIG. 2a are the performance change of the conventional scheme and the proposed integrated scheme with the increase of transmitted power, respectively; two curves in FIG. 2b are the change of backward Stokes optical power of the conventional scheme and the proposed scheme with the increase of transmitted power, respectively; two curves in FIG. 2c are the transmission performance for different received powers of the conventional scheme at the optimal transmitted power (9 dBm) and the proposed scheme at the optimal transmitted power (16 dBm), respectively.

Figure 3A:
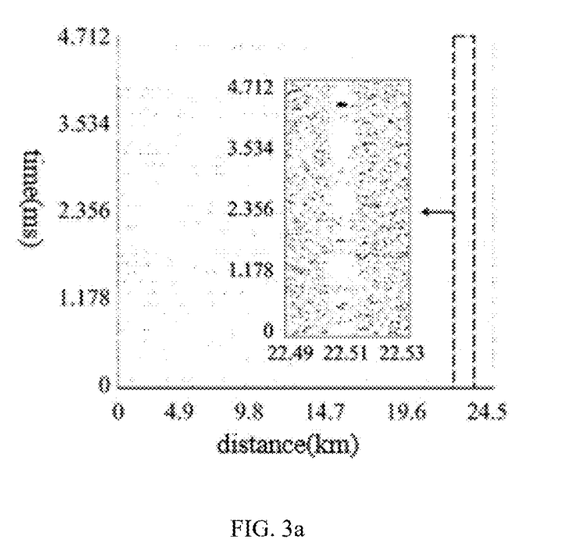
FIG. 3a: is the vibration response distance-time distribution diagram on the entire optical fiber link.
Figure 3B:
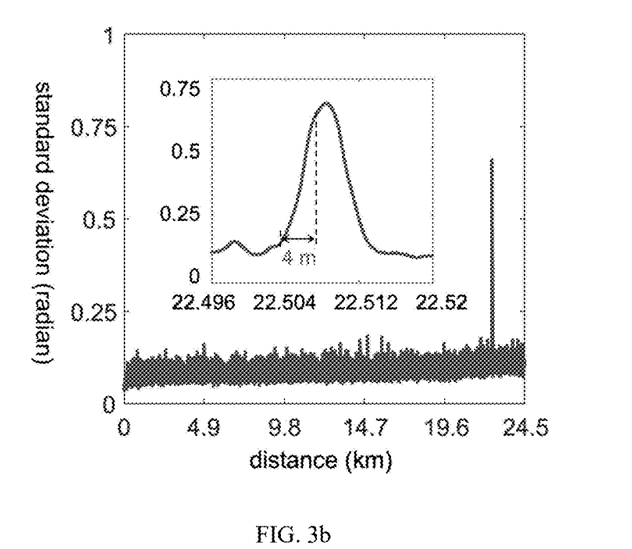
FIG. 3b is the phase standard deviation curve corresponding to FIG. 3a, which clearly shows the vibration location and its standard deviation.
Figure 3C:
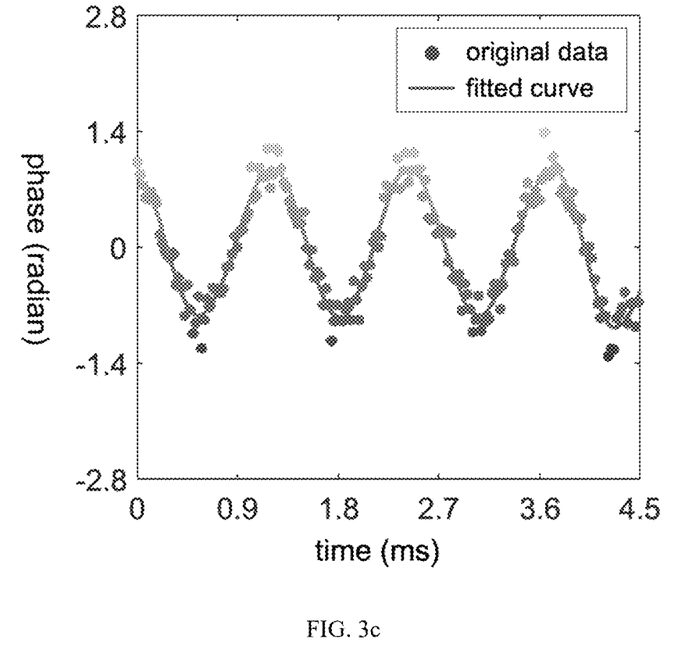
FIG. 3c is the measured vibration signal.
Figure 3D:
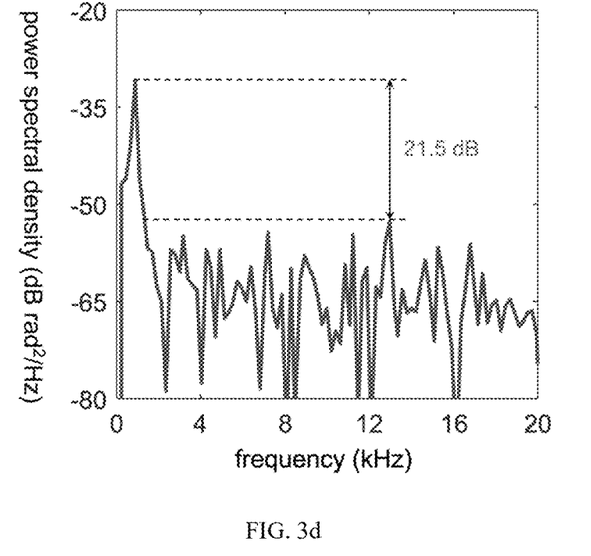
FIG. 3d is the spectrum corresponding to the time-domain signal in FIG. 3c.

A test result of distributed vibration performance of the present invention is shown in FIG. 3a-d, FIG. 3a is a vibration response distance-time distribution curve on the entire optical fiber link; FIG. 3b is a corresponding phase standard deviation curve; FIG. 3c is a time-domain curve of the measured vibration signal; and FIG. 3d is the corresponding spectrum.

Figure 4A:
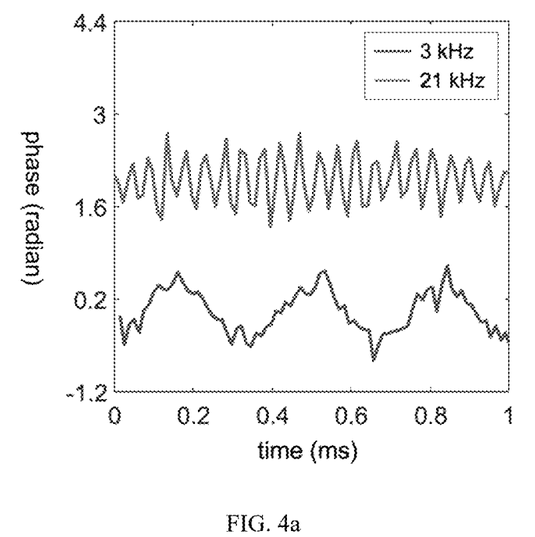
FIG. 4a: a time-domain diagram of the 3 kHz and 21 kHz vibration signals.
Figure 4B:
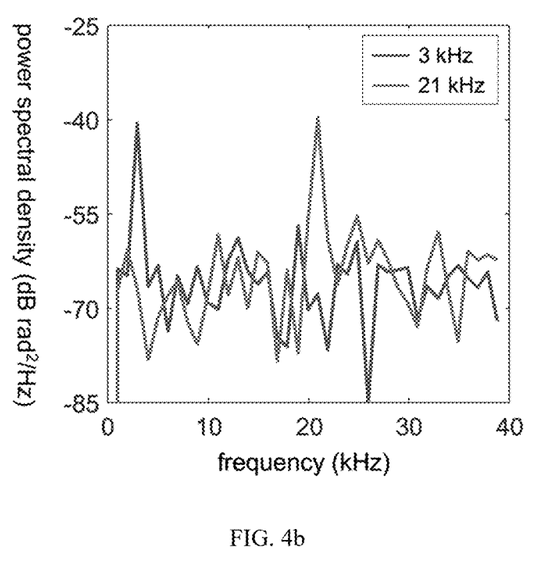
Figure 4C:
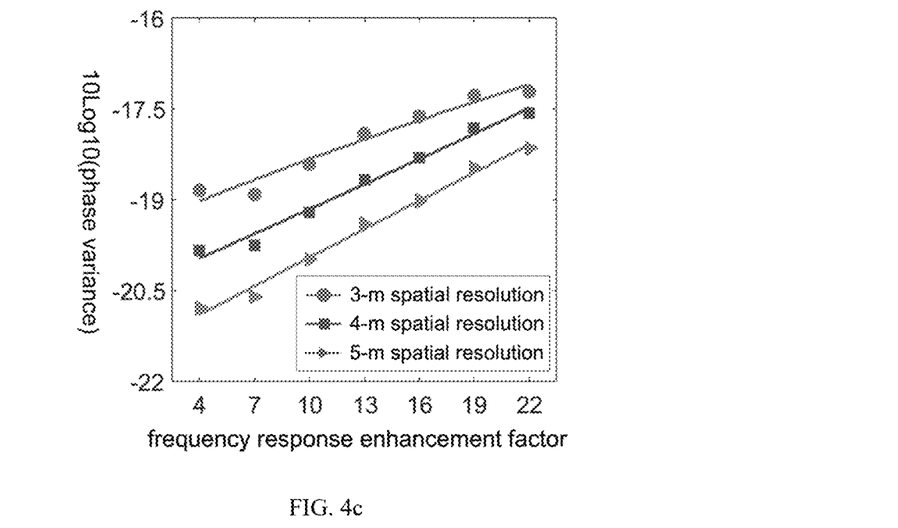
FIG. 4c: the relationship between different frequency response enhancement factors and the measurement accuracy.

FIG. 4a-c is a result diagram corresponding to changing the frequency response enhancement factor, FIG. 4a is a time-domain curve of the 3 kHz and 21 kHz vibration signals; FIG. 4b is a corresponding spectrogram; and FIG. 4c is a relationship curve between different frequency response enhancement factors and the measurement accuracy.

Figure 5A:
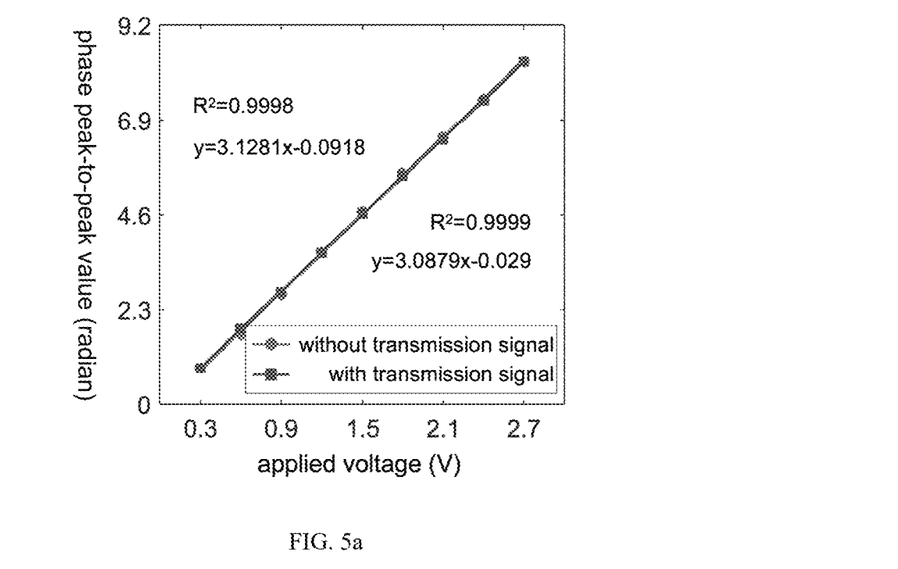
FIG. 5a: the vibration response changes before and after loading the transmission signal.
Figure 5B:
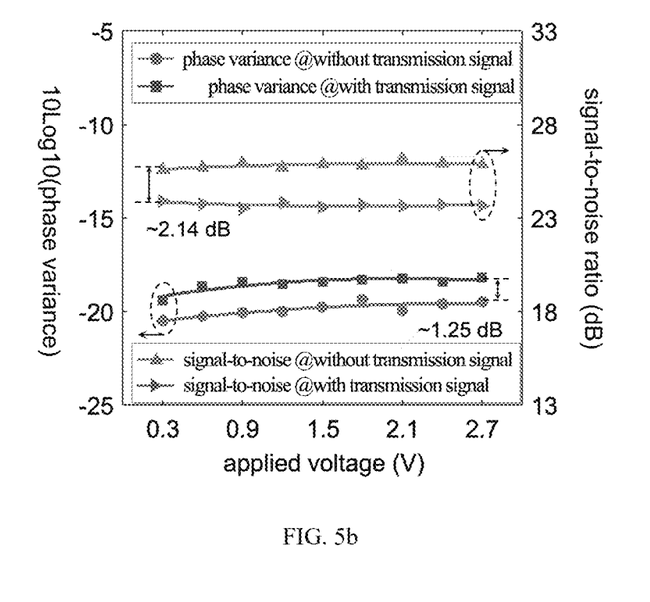
FIG. 5b: the signal-to-noise ratio and phase variance changes before and after loading the transmission signal.
Figure 5C:
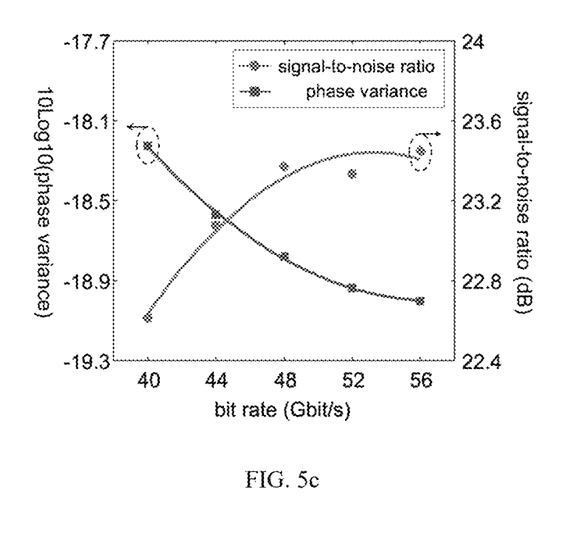
FIG. 5c: the effect of loading the transmission signals with different bit rates on the sensing performance, including the signal-to-noise ratio and the phase variance.

FIG. 5a-c is a result diagram of the sensing performance changes before and after loading the communication transmission code, FIG. 5a is the vibration response changes before and after loading the transmission signal; FIG. 5b is the signal-to-noise ratio and phase variance changes before and after loading the transmission signal; and FIG. 5c is the effect of loading the transmission signals with different bit rates on the sensing performance, including the signal-to-noise ratio and the phase variance.

In summary, the present invention provides a simple, compact and high-efficiency integrated system for optical fiber sensing and communication through sharing the co-frequency resources, to solve the deficiencies of the existing integrated system in practical applications.

What is claimed is:

1. An integrated system for optical fiber sensing and communication through sharing co-frequency resources, characterized in that, a transmission optical signal and a sensing detection light are generated by the same laser, transmission performance and sensing performance of the system are changed by adjusting modulation power of a transmission signal, the transmission signal is obtained by using direct detection at far-end, a sensing signal is obtained by using heterodyne coherent detection at local-end, and a specific structure is:

continuous light output from a continuous wave laser (1) is divided into two paths after passing through a 90:10 fiber coupler A(2), 90% of the continuous light of an upper branch is injected into a mach-zehnder modulator A(4) after being adjusted by a polarization controller A(3), the mach-zehnder modulator A(4) operates in a carrier suppression modulation mode, the mach-zehnder modulator A(4) is driven by a linear FM signal generated by an arbitrary waveform generator (5) to generate a linear FM optical sideband, and light output from the mach-zehnder modulator A(4) passes through an optical filter (7) after being amplified by an erbium-doped fiber amplifier A(6), to retain only +1-order or −1-order sidebands and remove all remaining optical signals; a linear FM optical carrier output by the optical filter (7) is injected into a mach-zehnder modulator B(9) after adjusting a polarization state by a polarization controller B(8), the mach-zehnder modulator B(9) is driven by a transmission signal generated from another port of the arbitrary waveform generator (5), an optical signal output from the mach-zehnder modulator B(9), after compensating for optical power loss by an erbium-doped fiber amplifier B(10), is injected into an optical fiber (12) via an optical fiber annular (11), and an optical signal output from a far end of the optical fiber (12) is converted into an electrical signal with a photodetector (13), and is subjected to digital signal processing after being acquired by a data acquisition device (14); scattered light generated in the optical fiber (12) is output via a third port of the annular (11), output continuous light is coupled with continuous light output from a 10% output arm of the fiber coupler A(2) by a fiber coupler B(15) with a splitting ratio of 1:1, the 10% output arm of the fiber coupler A(2) is used as local light, two output arms of the fiber coupler B(15) are injected into two input ends of a balance detector (16) respectively, to perform photoelectric conversion, and an electrical signal output from the balance detector (16) is subjected to post-processing after being acquired by a data acquisition card (17).

2. The integrated system for optical fiber sensing and communication through sharing co-frequency resources according to claim 1, characterized in that, the system adopts the linear FM optical carrier both as an optical carrier for pulse amplitude modulated transmission signal and as detection light for distributed optical fiber sensing.

3. The integrated system for optical fiber sensing and communication through sharing co-frequency resources according to claim 1, characterized in that, a system communication signal and a distributed sensing signal are detected and demodulated at the far-end and the local-end, respectively.

4. The integrated system for optical fiber sensing and communication through sharing co-frequency resources according to claim 3, characterized in that, the distributed sensing signal is acquired using the heterodyne coherent detection, and only a Rayleigh scattered signal corresponding to the linear FM optical carrier is retained in signal detection.

* * * * *